United States Patent [19]
Heynderickx et al.

[11] Patent Number: 5,686,153
[45] Date of Patent: Nov. 11, 1997

[54] OPTICAL TEMPERATURE INDICATOR

[75] Inventors: Ingrid E.J.R. Heynderickx; Dirk J. Broer, both of Eindhoven, Netherlands

[73] Assignee: U.S. Philips Corporation, New York, N.Y.

[21] Appl. No.: 783,186

[22] Filed: Jan. 15, 1997

Related U.S. Application Data

[63] Continuation of Ser. No. 408,755, Mar. 22, 1995, abandoned.

[30] Foreign Application Priority Data

Mar. 24, 1994 [EP] European Pat. Off. .............. 94200762

[51] Int. Cl.$^6$ .................................................. C09K 19/02
[52] U.S. Cl. ....................... 428/1; 252/299.01; 374/162
[58] Field of Search .......................... 428/1; 252/299.01; 374/162; 116/216

[56] References Cited

U.S. PATENT DOCUMENTS

| | | | |
|---|---|---|---|
| 4,070,912 | 1/1978 | McNaughton | 428/1 |
| 4,246,302 | 1/1981 | Benton et al. | 428/1 |
| 4,358,391 | 11/1982 | Finkelmann et al. | 252/299.01 |
| 4,702,558 | 10/1987 | Coles et al. | 350/330 |
| 4,868,250 | 9/1989 | DeMartino et al. | 525/479 |

FOREIGN PATENT DOCUMENTS 0205261  12/1986  European Pat. Off. .

Primary Examiner—Alexander Thomas
Attorney, Agent, or Firm—Ernestine C. Bartlett

[57] ABSTRACT

The invention relates to an optical temperature indicator. The indicator comprises an optically active layer of a transparent polymeric material in which liquid-crystalline material is dispersed. The molecules of the liquid-crystalline material form part of a polymeric structure via covalent bonds, for example as side-chain groups. The polymeric structure is preferably based on a siloxane. Such an indicator exhibits a good mechanical stability, while the opacity is preserved for a long period of time.

9 Claims, 2 Drawing Sheets

OPTICAL TEMPERATURE INDICATOR

This is a continuation of application Ser. No. 08/408,755, filed Mar. 22, 1995 now abandoned.

FIELD OF THE INVENTION

The invention relates to an optical temperature indicator comprising an optically active layer of transparent polymeric material in which liquid crystalline material is dispersed. The invention also relates to an apparatus having such an indicator.

BACKGROUND OF THE INVENTION

An optical temperature indicator of the above-mentioned type is known per se. For example, in European Patent Application EP-A 205.261, a description is given of an indicator which comprises an optically active layer of microdroplets of low-molecular liquid crystalline material which is dispersed in the polymeric reaction product of triallyl isocyanurate and a polythiol. Due to the fact that the liquid crystalline material mixes poorly with the polymeric reaction product, phase separation causes microdroplets in the transparent polymeric material. Such an optically active material is also referred to as "polymer dispersed liquid crystal" (PDLC).

A layer of PDLC material has the property that, dependent upon the temperature of the layer, incident light is transmitted or scattered. Scattering takes place at a temperature below the so-called clearance temperature of the liquid crystalline material. The liquid crystalline material of the droplets then is in an ordered phase, so that optical birefringence occurs. As the direction of orientation of the droplets in the polymeric matrix is randomly distributed, light incident on this layer is scattered. This causes the layer to be opaque.

At temperatures above the clearance temperature, the ordering of the liquid-crystalline material in the droplets is lost. As the refractive index of the transparent polymeric matrix substantially matches that of the isotropic liquid-crystalline material, the layer becomes transparent under these circumstances. The clearance temperature of a liquid-crystalline material is the temperature at which a transition from the anisotropic phase to the isotropic phase takes place. The clearance temperature is governed by the chemical composition and structure of the liquid-crystalline material. The chemical composition and structure also determine whether the material exhibits nematic, cholesteric or smectic properties below the clearance temperature.

The known indicator has various disadvantages. For example, if the layer is used as a self-supporting film, the mechanical stability of the layer is insufficient. If the known optically active layer is heated for a relatively long period of time to temperatures of 80° C. or higher, the opacity, which arises when said layer is cooled to a temperature below the clearance temperature, decreases. In addition, it has been found that such a layer "perspires" at relatively low temperatures. After a prolonged period of time this also leads to a decrease in opacity of the layer. Under both circumstances, this decrease is accelerated if the layer is subjected to a mechanical load.

SUMMARY OF THE INVENTION

It is an object of the invention to overcome the above disadvantages. The invention more particularly aims at providing an optical temperature indicator which has a good mechanical stability and whose optically active layer retains its opacity for a prolonged period of time.

These and other objects of the invention are achieved by an indicator as described in the opening paragraph, which is characterized in that the molecules of the liquid-crystalline material form part of a polymeric structure via covalent bonds.

The invention is based on the insight that the decrease in opacity of the known indicator can be directly attributed to the use of low-molecular liquid-crystalline molecules. Said molecules can escape relatively easily from the transparent polymeric material by evaporation or perspiration. This process is further accelerated by using high temperatures or applying a mechanical load. However, if the liquid-crystalline molecules, instead of being able to move freely, form part of a polymeric structure via one or more covalent bonds, it is substantially impossible for said molecules to escape from the optically active layer.

It is noted that the above-mentioned disadvantages can also be partially overcome by hermetically sealing the optically active layer by means of two adjoining, transparent substrates, for example of glass. However, such a solution is relatively expensive. Besides, the use of the indicator on a substrate which is uneven is practically impossible if glass substrates must be used.

Any transparent polymeric material can be used for the optically active layer, provided that it is poorly miscible with the liquid-crystalline material. Preferably, however, combinations of a polymeric material and a liquid-crystalline material are chosen which have a substantially equal refractive index above the clearance temperature. In this case, optimum transparency of the indicator above the clearance temperature is achieved.

Examples of applicable transparent polymers are: linear polymers of epoxides, polyvinyl ethers and polycarbonates. However, the use of branched polymers, which form a three-dimensional network upon polymerization, are preferred. They provide the optically active layer with additional mechanical and thermal stability. Particularly polyacrylates on the basis of monomers comprising two acrylate groups have proved to be very suitable in this respect. The ratio (in wt. %) of the transparent polymeric material to the liquid-crystalline material incorporated in a polymeric structure may vary from 20:80 to 80:20. This ratio is preferably chosen to be in the range from 30:70 to 70:30. The best results are achieved if the quantity of liquid-crystalline material in the mixture exceeds that of transparent polymeric material by approximately 20 wt. %.

The covalently bonded liquid-crystalline molecules may form part of the polymeric structure in various ways. For example, in principle it is possible to incorporate these molecules into the main chain of a polymer via two covalent bonds. It has however been found that in such a configuration of the polymeric structure, the ordering of the liquid-crystalline material reacts relatively slowly to changes in temperature. Consequently, an indicator of this type exhibits a high degree of hysteresis when temperature changes succeed each other rapidly.

Therefore, a preferred embodiment of the optical temperature indicator is characterized in that the liquid-crystalline molecules are incorporated in the polymeric structure as side-chain groups. By virtue of the relatively high mobility of the liquid-crystalline side-chain groups, the hysteresis of this embodiment of the indicator is relatively small.

Another preferred embodiment of the optical temperature indicator in accordance with the invention is characterized in that a liquid-crystalline siloxane is used as the polymeric structure. This type of polymeric structure exhibits a good resistance to high temperatures. It has been found that the optically active layer of the indicator in accordance with this embodiment exhibits extremely high thermal stability. The expression "polymeric structures" is to be understood to mean herein a polymer which comprises at least three monomeric units. These polymers may have both a linear and a branched structure. Satisfactory results have been obtained with cyclic polymers, in particular cyclic siloxanes, which comprise three or four monomeric units. The liquid-crystalline units are incorporated in the polymeric structure as side-chain groups. Indicators of this type react very rapidly and accurately to temperature changes.

Another interesting embodiment of the indicator is characterized according to the invention in that the optically active layer is provided on a colored substrate and said optically active layer comprises a dye which contrasts with the color of the substrate. This embodiment enables the use of generally accepted contrasting color combinations in the indicator, such as the combination red/blue for "hot/cold" and the combination green/rod for "not dangerous/dangerous". At temperatures above the clearance temperature, the color of the substrate is dominant, whereas at temperatures below the clearance temperature, the color of the optically active layer is dominant. The substrate does not have to be uniform in color. It is alternatively possible to use a transparent substrate which is provided with colored text or characters. This text or these characters become visible at temperatures above the clearance temperature. It is noted that the addition of a dye to the optically active layer is already known from the above-mentioned Patent document EP-A 205.261.

A further interesting embodiment of the indicator in accordance with the invention is characterized in that the optically active layer is composed of at least two sub-layers, the liquid-crystalline material of said sub-layers having different clearance temperatures, and each of the sub-layers comprising a different dye. Owing to the presence of at least two optically active sub-layers, the indicator may exhibit more than one change in color in a specific temperature range.

The invention also relates to an apparatus comprising a temperature-sensitive portion which can be optically inspected. In accordance with the invention, this apparatus is provided with an optical temperature indicator as described hereinabove. The apparatus concerned preferably have an optical temperature indicator which has a signal function, such as in irons, coffee makers, hairdriers, electrical cookers, ovens and deep-fat fryers. In this case, indicators which are very suitable comprise a red-colored substrate, with the optically active layer comprising a blue dye and having a clearance temperature, for example, of 70° C. The indicator must be provided on a temperature-sensitive portion of such an apparatus or be in contact with a temperature-sensitive portion via a heat-conductive connection. If the temperature of parts of this apparatus is such that these parts constitute a fire risk, this is indicated by the red indicator. At lower temperatures, the blue indicator indicates that the apparatus no longer constitutes a fire risk.

The inventive indicator can also be used on other apparatus, for example, as a low-temperature indicator on packaged foodstuffs and beverages. In this case, the indicator indicates whether or not the storage temperature of the foodstuffs or the consumption temperature of the drink has been exceeded. This can be indicated by means of a change in color or a warning in the form of text or characters.

BRIEF DESCRIPTION OF THE DRAWINGS

The invention will be explained in greater detail by means of exemplary embodiments and a drawing, in which.

DETAILED DESCRIPTION OF THE PREFERRED EMBODIMENTS

Figure 1:
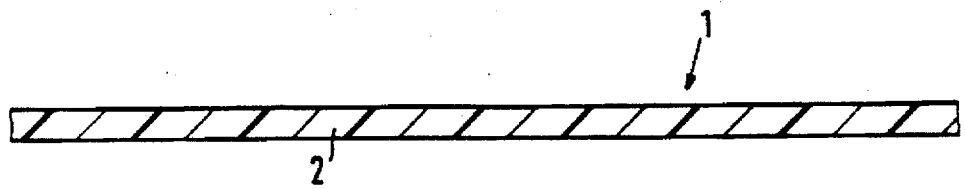
FIG. 1 is a first embodiment of an optical temperature indicator in accordance with the invention.

FIG. 1 shows an optical temperature indicator 1 which is comprised of a self-supporting, optically active layer 2. Said layer comprises a transparent polymeric material in which a liquid-crystalline material is dispersed. The molecules of the liquid-crystalline material are incorporated into a polymeric structure via a covalent bond.

Figure 4A:
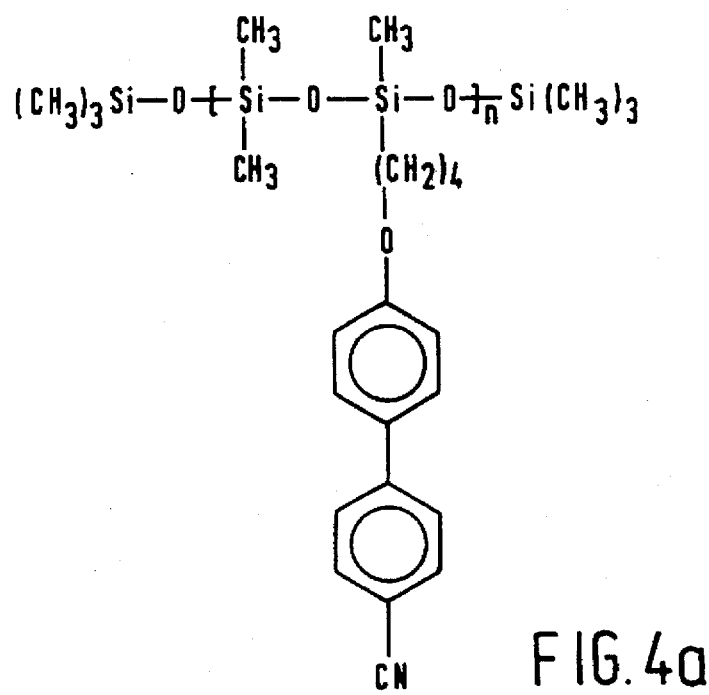
Figure 4B:
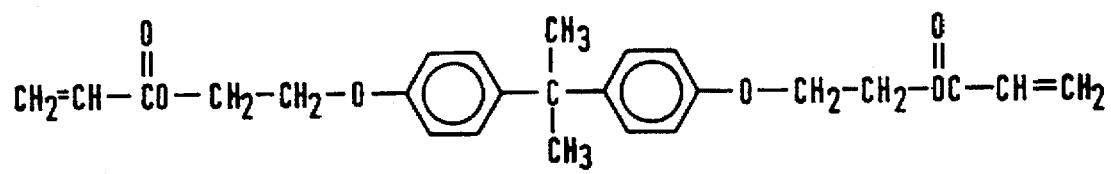
Figure 4C:
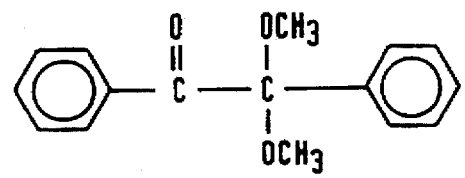

The indicator of FIG. 1 was manufactured as follows. The siloxane polymer having liquid-crystalline side-chains (LCP093, Merck-BDH), shown in FIG. 4-$a$, was mixed with the diacrylate monomer (SR349, Sartomer), shown in FIG. 4-$b$, in a weight ratio of 6:4 at a temperature of 100° C. A quantity of 2 wt. % of the photoinitiator Irgacure 651 (see FIG. 4-$c$) was added to this mixture. The mixture was rolled out on a non-adherent substrate to form a highly viscous foil having a thickness of approximately 400 microns. Said foil was subsequently exposed to UV-light at room temperature for several minutes, so that polymerization of the diacrylate monomers took place. Upon photopolymerization, phase separation took place. The optically active layer formed is opaque at room temperature and has a white appearance in daylight. The layer was found to be self-supporting and flexible.

The optically active layer serving as an optical temperature indicator was secured to a heating element by means of a thermally stable adhesive. Upon heating of the element, the indicator lost its white appearance at 79° C. and became transparent above said temperature. It was found that the opacity returned after the heating element Bad cooled. The unprotected indicator was found to be stable for at least 3 weeks at 140° C. After said period of time, the layer became opaque again after cooling. SEM recordings at room temperature showed that the optically active layers in accordance with the invention comprised wire-like structures. SEM measurements on the known optically active layers of the PDLC-type show droplet-shaped structures.

The indicator of FIG. 1 can be alternatively manufactured as follows: LCP093 (60 wt. %) was mixed with polystyrene (40 wt. %). A quantity of 4 volumes of toluene were added to this mixture, so that the mixture can be worked from solution by means of a doctor blade or screen printing. In this manner, the solution was provided on a non-adherent substrate in a layer thickness of approximately 200 microns. After evaporation of the toluene, an approximately 50 microns thick optically active layer is obtained. The indicator thus formed also has a clearance temperature of approximately 79° C.

The indicator of FIG. 1 can alternatively be manufactured by means of a thermo-curing polymer. In this case, LCP093

(70 wt. %) is mixed with 30 wt. % of a thermo-curing epoxy (UHU-plus; binding agent/hardening agent=1.2/1.0). This mixture was worked into an approximately 150 microns thick foil by means of a doctor blade at room temperature. Said foil was subsequently cured at a temperature of 70° C. for approximately 45 minutes. An indicator of this type was found to be stable for 24 hours at 200° C. After cooling, the optically active layer became scattering again.

The indicator of FIG. 1 can alternatively be manufactured in yet another manner. Siloxane LCP093 (50 wt. %) was mixed with polycarbonate (50 wt. %) to form a homogeneous mixture which, after extrusion, pressing or injection moulding, was worked from the melt at a temperature of approximately 240° C. into a thin, self-supporting plate. In this manner, an optically active layer having a clearance temperature of approximately 82° C. was obtained. Said plate was highly scattering at room temperature, but became transparent at temperatures above room temperature. If this plate is applied to a substrate which is colored or provided with text, said color or text becomes visible at temperatures above said clearance temperature.

Figure 2:
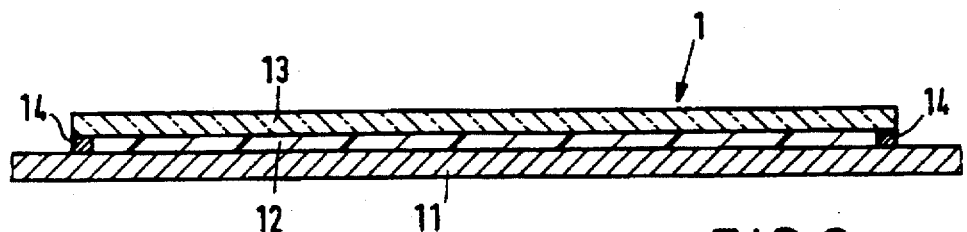
FIG. 2 is a second embodiment of an indicator of the invention.

A second embodiment of the inventive indicator 1 is shown in FIG. 2. Said indicator comprises a heat-conductive substrate 11, for example of anodized aluminum. In this case, the substrate is of a red color. A blue optically active layer 12 having a thickness of 150 microns is provided on this substrate. The optically active layer is covered with an optically transparent protective coating 13, for example of glass or synthetic resin foil (for example Teflon-FEB; DuPont), which directly contacts the substrate via an annular spacer 14.

The indicator of FIG. 2 was manufactured as follows. To the above-described mixture of LCP093, SR349 and Irgacure 651, there was added 0.5 wt. % of a blue dye (M-843 AQ, Mitsui Toats). The mixture was screen printed at a relatively high temperature onto a substrate of red anodized aluminum which was provided with a spacer. Subsequently, a protective glass layer was applied to the optically active layer, whereafter the mixture was polymerized by means of UV-light.

The indicator thus obtained is blue at a temperature below the clearance temperature (79° C.). If the indicator is heated to a temperature above this temperature, the blue color disappears and the red color of the substrate becomes visible. After cooling to a temperature below said clearance temperature, the blue color of the optically active layer becomes predominant again. This indicator can be secured, for example, to the window of an oven by means of a heat-resistant adhesive.

Comparative tests with the indicator of FIG. 1 have shown that the presence of the protective layer of glass on the optically active layer substantially increases the life of the indicator. The indicator provided with a protective layer remained stable for at least 4 weeks at 160° C. After this period of time the layer became blue again after cooling.

Figure 3:
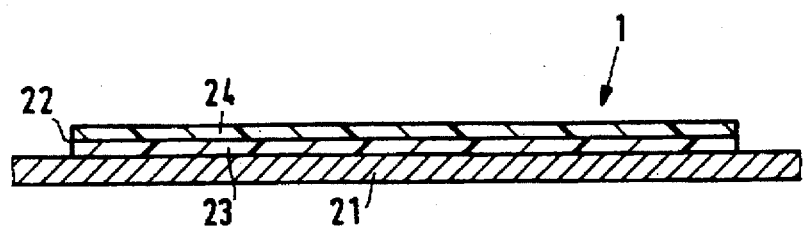
FIG. 3 is a third embodiment of an indicator of the invention, FIGS. 4(a–c) shows a number of chemical structures of compounds used within the scope of the invention.

A third embodiment of the inventive indicator 1 is shown in FIG. 3. This indicator comprises a heat-conductive substrate 21 of a red polycarbonate foil. An optically active layer 22 which comprises two sub-layers 23 and 24 is provided on this substrate. Sub-layer 23 is identical to the optically active layer of the indicator described with respect to FIG. 2. Sub-layer 24 comprises a liquid-crystalline material having a lower clearance temperature and a green dye. Both sub-layers have a thickness of approximately 100 microns.

The indicator in accordance with FIG. 3 was manufactured in the following manner. A flexible foil of red polycarbonate having a thickness of 1.2 mm was provided with a thin layer (typically 100 microns) of an optically active mixture by means of a doctor blade at 95° C. This mixture comprised 60 wt. % LCP093, 40 wt. % SR349, 2 wt. % Irgacure 651 and 0.5 wt. % of a blue dye (M-483 AQ). This layer was cured at room temperature by means of UV-light. A second sub-layer of approximately the same thickness was applied to this first sub-layer by means of a doctor blade at a temperature of 90° C. For this second sub-layer, use was made of an optically active mixture comprising 50 wt. % LCP137 (Merck-BDH), 50 wt. % SR349, 2 wt. % Irgacure 651 and 0.5 wt. % of the yellow dye CRACET gelb 8GF (Ciba Geigy). The second sub-layer was also cured at room temperature by means of photopolymerization.

The indicator of FIG. 3 has two transition points. The clearance temperature of LCP137 is approximately 58° C., while that of LCP093 is approximately 79° C. At room temperature, the indicator is yellowish green. If this indicator is heated, the yellowish-green color changes into blue above 58° C. as a result of the fact that the first sub-layer becomes transparent at this temperature. A further increase of the temperature to a value above 79° C. causes the color of the indicator to change from blue to red. At this temperature, also the second sub-layer becomes transparent, so that the red substrate becomes visible. Upon cooling to room temperature, in succession, the colors red, blue and yellowish green become visible.

Figure 5:
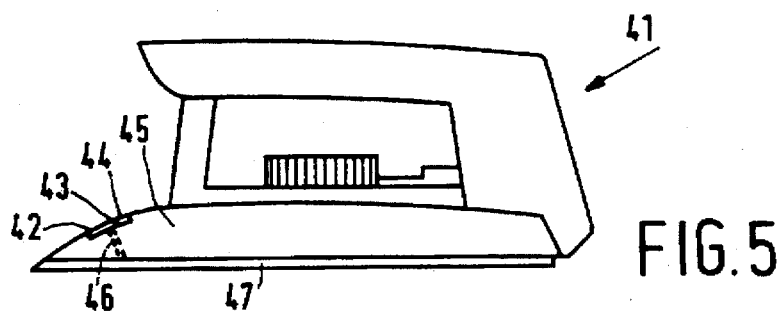
FIG. 5 shows an iron comprising an indicator in accordance with the invention.

FIG. 5 schematically shows an iron 41 comprising an optical temperature indicator 42 in accordance with the invention. Said indicator comprises a red substrate 43 of anodized aluminum and a blue, optically active layer 44 having a clearance temperature of 60° C. The indicator is provided on the synthetic-resin housing 45 of the iron. A heat-conductive connection 46 between the soleplate 47 of the iron and the substrate of the indicator enables the heat to be rapidly transferred from the soleplate to the indicator. The user can see at a single glance whether the soleplate of the iron is hot (color of the indicator: red) or cool (color of the indicator: blue). Obviously, this indicator can also be used on other thermal apparatus, such as ovens, hot plates, coffee makers, hairdriers, microwave ovens, etc.

Figure 6:
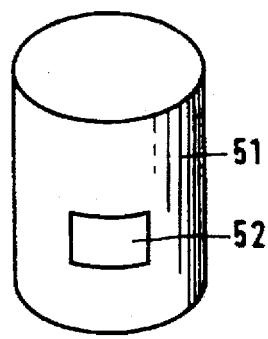
FIG. 6 shows a beverage package which is provided with an indicator in accordance with the invention.

FIG. 6 shows a beverage package in the form of an aluminum can 51 which is provided with an optical temperature indicator 52 in accordance with the present invention. Said indicator is in the form of a flexible, self-supporting foil which is secured directly to the can by means of an adhesive. The foil comprises a liquid-crystalline material having a clearance temperature of approximately 5° C. and a dye whose color contrasts with that of the can. The consumer can see at a single glance whether the can is at the desired temperature below 5° C. (the indicator exhibits the contrasting color) or not (the indicator exhibits the background color of the can). Obviously, this type of indicator can also be used for other types of containers, such as synthetic resin containers for perishables, such as meat products.

We claim:

1. An optical temperature indicator comprising an optically active layer of a transparent polymeric material and a liquid crystalline material, said transparent polymeric material being poorly miscible with said liquid crystalline material and said liquid crystalline material being dispersed in said transparent polymeric material, characterized in that the molecules of the liquid crystalline material form part of a polymeric structure separate from said polymeric material via covalent bonds.

2. An optical temperature indicator as claimed in claim 1 wherein the liquid-crystalline molecules are incorporated in the polymeric structure as side-chain groups.

3. An optical temperature indicator as claimed in claim 2, wherein a liquid-crystalline siloxane is used as the polymeric structure.

4. An optical temperature indicator as claimed in claim 1 wherein liquid-crystalline siloxane is used as the polymeric structure.

5. An apparatus comprising a temperature-sensitive portion which can be optically inspected, wherein this portion is provided with an optical temperature indicator as claimed in claim 1.

6. An optical temperature indicator comprising an optically active layer of a transparent polymeric material and a liquid crystalline material, said transparent polymeric material being poorly miscible with said liquid crystalline material and said liquid crystalline material being dispersed in said transparent polymeric material, wherein the molecules of the liquid crystalline material form part of a polymeric structure via covalent bonds and wherein the optically active layer is provided on a colored substrate and said optically active layer comprises a dye which contrasts with the color of the substrate.

7. An optical temperature indicator as claimed in claim 6 wherein the optically active layer is composed of at least two sub-layers, the liquid-crystalline material of said sub-layers having different clearance temperatures and each of the sub-layers comprising a different dye.

8. An optical temperature indicator comprising an optically active layer of a transparent polymeric material and a liquid crystalline material, said transparent polymeric material being poorly miscible with said liquid crystalline material and said liquid crystalline material being dispersed in said transparent polymeric material, wherein the molecules of the liquid crystalline material form part of a polymeric structure via covalent bonds and are incorporated in the polymeric structure as side chain groups wherein the optically active layer is provided on a colored substrate and said optically active layer comprises a dye which contrasts with the color of the substrate.

9. An optical temperature indicator comprising an optically active layer of a transparent polymeric material and a liquid crystalline material, said transparent polymeric material being poorly miscible with said liquid crystalline material and said liquid crystalline material being dispersed in said transparent polymeric material, wherein the molecules of the liquid crystalline material form part of a polymeric structure via covalent bonds, said polymeric structure being a liquid-crystalline siloxane and wherein the optically active layer is provided on a colored substrate and said optically active layer comprises a dye which contrasts with the color of the substrate.

* * * * *